(No Model.)
A. C. McKERCHER.
CANDELABRUM.
No. 518,650. Patented Apr. 24, 1894.
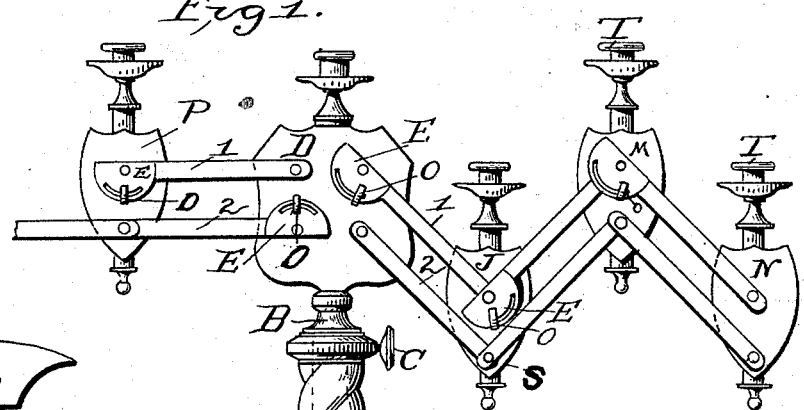
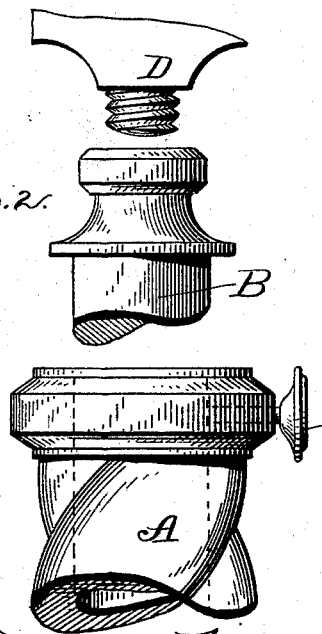
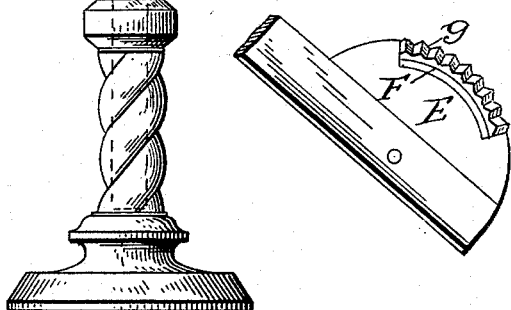
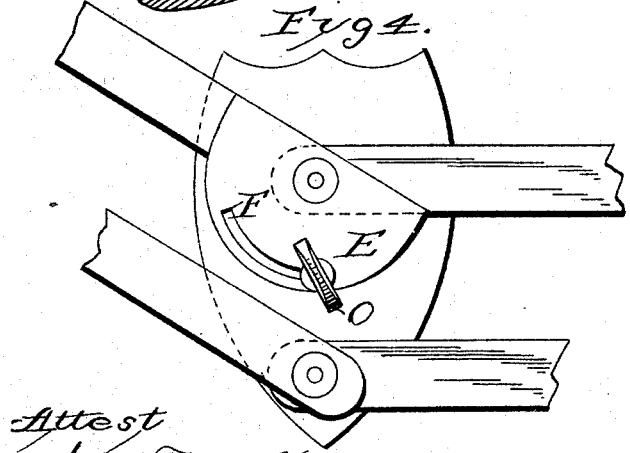
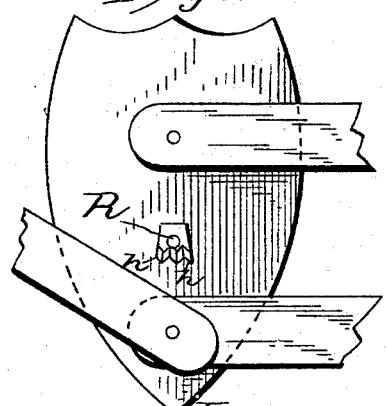
Attest
Wm. T. Hall
Walter Smallbury
Inventor
Alphonse Charles McKercher
by Richards & Co.
Attys.

UNITED STATES PATENT OFFICE.

ALPHONSE CHARLES McKERCHER, OF MONTREAL, CANADA, ASSIGNOR TO ALBERT GAUTHIER, OF SAME PLACE.

CANDELABRUM.

SPECIFICATION forming part of Letters Patent No. 518,650, dated April 24, 1894.

Application filed August 3, 1893. Serial No. 482,324. (No model.)

*To all whom it may concern:*

Be it known that I, ALPHONSE CHARLES MCKERCHER, a subject of the Queen of Great Britain, residing at Montreal, in the county of Hochelaga, Province of Quebec, and Dominion of Canada, have invented a new and useful Candelabrum, of which the following is a specification.

My invention includes a series of parallelograms, jointed together and connected to a main stand disposed as hereinafter described, and the object being to give to the branches of the candelabrum any required inclination and to the candelabrum itself any required elevation.

Referring to the drawings, which form a part of this specification, Figure 1 is a general elevation of a candelabrum embodying my invention. Fig. 2 is an elevation of part of the stand. Fig. 3 shows an arm of one of the parallelograms, forming the branches of my candelabrum. Figs. 4 and 5 are illustrations of the means of connection of two adjoining parallelograms.

In my candelabrum, the stand consists of two parts, the outer stand A and the inner stand B; the outer stand A is hollow in the center in which fits the inner stand B, which may be elevated or lowered to any required position and clamped by means of the clamp screw C. The top of the inner stand B carries a shield D to which are attached the series of parallel arms, 1, 2, which go to make up the parallelogram system. At the junction of each parallelogram, the arms are bolted and jointed together and to the shields P, S, M, N, on each of which is solidly fixed a rack R Fig. 5 furnished with teeth $h, h$, and a clamp screw O. One arm of each parallelogram is attached at one extremity to a semi-circular face wheel E, which in turn is furnished with a groove, F, concentric with the semi-circumference of the wheel E; on the under surface of the wheel E is a series of teeth, $g, g$, whose pitch coincide with that of the teeth $h, h$ of the rack R. The parallelograms may be increased to any number consistent with the strength of the stand.

When any required position is desired to be given to the branches of my candelabrum, the shields P, S, M, N are elevated or lowered carrying with them the ends of the arms of the adjoining parallelograms, the clamp screw O, having been loosened will move in the groove F of the semi-circular wheel E and when the required position is attained, the wheel E is clamped to the rack R by the screw O and perfect rigidity is obtained by the grooving of the teeth $g\ g$ and $h, h$. The inner stand, B and the shields P, S, M, N, bear the candle sticks, carrying the tapers which may be made to describe any required shape or figure. The holders for the candles are shown at T.

What I claim as my invention, and desire to secure by Letters Patent, is—

In combination the standards, the series of shields each having rack teeth R, the series of parallel arms or rods 1, 2, the said rods 2 being pivoted to the shields, each of the said rods 1 having at one end a slotted face plate E pivoted to one shield and having its opposite end pivoted to the next shield and axially of the face plate of the next arm 1 and the clamp screws for holding the slotted face plates, the pairs of arms 1, 2, with their respective face plates and shields being capable of adjustment independent of the other pairs of arms with their shields and face plates, substantially as described.

Montreal, January 5, 1893.

ALPHONSE CHARLES McKERCHER.

Witnesses:
   JOS. R. ROY,
   JOSEPH W. MIGNAULT.